Patented Sept. 29, 1925.

1,555,796

UNITED STATES PATENT OFFICE.

MAX ENDERLI, OF OESTRICH, GERMANY, ASSIGNOR TO RUDOLPH KOEPP & CO., OF OESTRICH, GERMANY, A CORPORATION OF GERMANY.

MANUFACTURE OF SODIUM FORMATE FROM CARBON MONOXIDE.

No Drawing. Application filed February 24, 1921. Serial No. 447,623.

(GRANTED UNDER THE PROVISIONS OF THE ACT OF MARCH 3, 1921, 41 STAT. L., 1313.)

*To all whom it may concern:*

Be it known that I, MAX ENDERLI, a citizen of the Swiss Confederation, residing at Oestrich, Rheingau, in the German Republic, have invented new and useful Improvements in the Manufacture of Sodium Formate from Carbon Monoxide, of which the following is a specification.

My invention relates to the manufacture of sodium formate and has for its object to provide a process for directly manufacturing concentrated sodium formate solutions by treating extreme dilute sodium sulfate solutions.

According to a proposed method sodium formate is produced by the action of carbon monoxide upon an equivalent mixture of sodium sulfate and milk of lime in the presence of water. According to this method the speed of reaction increases proportionally with the temperature, while the concentration of the solution has no appreciable influence on the speed of reaction, provided sufficient water is present. A solution of sodium sulfate of approximately 20° Bé. is used, therefore the concentration must be taken into consideration in order to be able to tell that a sufficient percentage of water is used.

I have found that such a sulfate concentration causes in fact an action which strongly hinders the reaction speed and that an extraordinary acceleration of the reaction can be produced if very dilute solutions, for instance solutions containing less than 7% of sodium sulfate are used.

I have also found that contrary to the effect of sodium sulfate the sodium formate which is produced does not disturb the process even at higher concentration.

Based upon these discoveries, I carry out the process in such a manner that I maintain the concentration of the sodium sulfate constantly low and that, on the other hand, I continue the process until concentrated formate solutions have been produced.

According to the invention the concentration of the sodium sulfate is maintained constantly low by means of a substance which regulates the concentration. This substance is the hitherto unknown basic sodium calcium sulfate the approximate composition of which is $Na_4Ca_3(SO_4)_4(OH)_2$ and which may be obtained, for instance, by heating in water sodium sulfate, calcium sulfate and a base or substance such as caustic lime able to form these compounds. In the presence of solid basic sodium calcium sulfate, solid caustic lime, and solid calcium sulfate the compound according to the above formula automatically keeps the concentration of the sulfate at the degree which is favourable to the reaction, a low degree of concentration varying with the temperature and being for instance 7% at 170° C.

The process according to my invention can be carried out for instance by treating 100 parts by weight of basic sodium calcium sulfate, 10 parts by weight of caustic lime, 1 part by weight of calcium sulfate and 250 parts of water, with carbon monoxide at a temperature of 160 to 170° C. in a closed vessel provided with a stirring device. These solid substances considerably reduce the already limited solubility (due to the presence of basic sodium calcium sulfate) of the sodium sulfate compound this being, as stated above, particularly advantageous for the formation of formate. Sodium formate is formed by the action of carbon monoxide upon this solution, but in proportion as the solution becomes poor in sodium sulphate the solid basic sulfate compound is dissolved and continuously brings the solution to its initial concentration, i. e. 7% in the present example. The solid basic sulfate compound is a source of supply of reactive alkali which may be entirely converted into formate and the concentration of formate to be obtained depends only upon the available supply of solid basic sodium calcium sulfate, which may be easily replaced.

The restoration of the basic sodium-calcium sulfate consumed by the reaction may be accomplished in the most simple manner, by producing the basic sodium-calcium sulfate as previously described but in a separate receptacle in front of the container in which the main reaction for the production of the formate is taking place. The total production of this preliminary reaction can be conducted directly into the main receptacle in such quantities as required, without separating the basic sodium-calcium sulfate from the other ingredients of this preliminary reaction.

The process according to this invention may also be carried out with simultaneously formation of basic sodium calcium sulfate in the formate-producing vessel; for instance, 100 parts by weight of sodium sulfate, 30 parts by weight of calcium sulfate, and 40 parts by weight of caustic lime are heated with 500 parts of water in an autoclave whereupon carbon monoxide is introduced therein.

A further method of carrying out the process according to this invention consists in allowing carbon monoxide to act upon sodium sulfate mixed with a hydroxide of an alkaline earth metal and water, the degree of concentration of the sodium sulfate in the reaction vessel being kept under the saturation concentration of the basic sodium calcium sulfate, and care being taken to replace the sulfate consumed. Thus for example a 5 to 6% solution of sodium sulfate mixed with several times the equivalent quantity of a hydroxide of an alkaline earth metal is treated with carbon monoxide, the sulfate absorbed by the reaction being replaced by an addition of concentrated sodium sulfate solution or of solid salt. Instead of the sulfate, substances may be used which contain the same or are liable to form it, these substances being for example calcium sodium sulfate or basic sodium calcium sulfate. It is not necessary for the required alkaline-earth metal hydroxide to be kept in store in the reaction vessel; it may be put therein while the process is going on, particularly in the form of a mixture with the sulfate or sulfate forming substances to be also added to the said vessel.

*Example.*—A 5% sodium sulfate solution and 3 to 4 times its equivalent quantity of caustic lime is submitted to the action of carbon monoxide at 160 to 170° C. As the conversion takes place sodium sulfate is replaced by introducing into the reaction vessel solid salt or salt in a highly concentrated aqueous solution or suspension, care being always taken that the concentration of sulfate in the mixture does not exceed the favourable degree which in this case is 5 to 6%.

Compared with the mode of working the invention by producing formates from basic sodium calcium sulfate, the mode of procedure last described has the advantage that the process may be carried out at a still lower degree of concentration of the sulfate within any desirable limits down to the utmost practical dilution. Thus again, compared with the first-mentioned mode, the mode last described renders it possible to increase the rapidity of reaction by 15% or more, whereas compared with the previously known process in which sodium formate was obtained by carbon monoxide reacting upon sodium sulfate mixed with an equivalent quantity of milk of lime, the rapidity of reaction is increased by 50% or more. The said mode has moreover the particular advantage that the conversion of the sodium compound from a sulfate into formate is quantitative.

The discovery that sodium formate has practically no influence on the reactive power of the solution renders it also possible to use more dilute formate solutions, for instance, washing water instead of water which solutions after being enriched with freshly formed formate are converted into concentrated solutions.

What I claim as my invention and desire to obtain by Letters Patent of the United States of America is:—

1. An improved process for the manufacturing of sodium formate consisting in causing carbon monoxide to act at high temperature upon a solution of sodium sulfate under the condition that the concentration of the solution of sodium sulfate is kept constantly low by the presence of solid basic sodium calcium sulfate, solid calcium hydroxide and solid calcium sulfate and in continuing the process until concentrations of formate are produced which are considerably higher than the concentration of the solution in sodium sulfate.

2. An improved process for the manufacturing of sodium formate consisting in causing carbon monoxide to act at high temperature upon a solution of sodium sulfate the concentration of which is kept constantly low by providing for the presence of solid calcium hydroxide, solid calcium sulfate and solid basic sodium calcium sulfate, said latter substance being produced separately and introduced into the reaction mixture, and in continuing the process until concentrations of formate are produced which are considerably higher than the concentration of the solution in sodium sulfate.

3. An improved process for the manufacturing of sodium formate consisting in causing carbon monoxide to act at high temperature upon solutions of sodium sulfate in diluted formate solutions under the condition that the concentration in sodium sulfate is kept constantly low by the presence of solid basic sodium calcium sulfate, solid calcium hydroxide and solid calcium sulfate and in continuing the process up to the formation of formate concentrations which are considerably higher than the concentration of the solution in sodium sulfate.

In testimony whereof I have signed my name to this specification.

Dr. MAX ENDERLI.